(12) United States Patent  
Lundy et al.

(10) Patent No.: US 8,190,128 B1  
(45) Date of Patent: May 29, 2012

(54) COVERT AND NON-COVERT MODE COMMUNICATION

(75) Inventors: Michael T. Lundy, Olathe, KS (US); Jason Kent Whitney, Lee's Summit, MO (US); Jason R. Delker, Olathe, KS (US); John Michael Everson, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 383 days.

(21) Appl. No.: 12/368,391

(22) Filed: Feb. 10, 2009

Related U.S. Application Data

(63) Continuation-in-part of application No. 12/060,320, filed on Apr. 1, 2008.

(51) Int. Cl.  
*H04M 1/68* (2006.01)

(52) U.S. Cl. ...... 455/411; 455/415; 455/445; 455/456.1; 455/412.1; 455/412.2; 380/229; 380/248; 380/250; 713/183; 713/184; 726/11; 726/14

(58) Field of Classification Search .......... 455/411, 455/415, 445, 456.1, 412.1, 412.2  
See application file for complete search history.

(56) References Cited

U.S. PATENT DOCUMENTS

| | | | |
|---|---|---|---|
| 5,493,692 A | 2/1996 | Theimer et al. | |
| 5,640,419 A | 6/1997 | Janusas | |
| 5,870,215 A | 2/1999 | Milano et al. | |
| 5,923,849 A | 7/1999 | Venkatraman | |
| 5,933,785 A | 8/1999 | Tayloe | |
| 5,987,325 A | 11/1999 | Tayloe | |
| 6,163,564 A | 12/2000 | Rudish et al. | |
| 6,583,714 B1 | 6/2003 | Gabou et al. | |
| 7,209,955 B1 | 4/2007 | Major et al. | |
| 7,250,846 B2 | 7/2007 | Ebling et al. | |
| 2002/0113688 A1 | 8/2002 | Ide | |
| 2005/0025315 A1* | 2/2005 | Kreitzer | 380/270 |
| 2005/0064854 A1 | 3/2005 | Jang | |
| 2006/0025112 A1 | 2/2006 | Hamanaga et al. | |
| 2006/0104445 A1 | 5/2006 | Lai et al. | |
| 2006/0123224 A1* | 6/2006 | Klug et al. | 713/150 |
| 2007/0072616 A1 | 3/2007 | Irani | |
| 2009/0088168 A1 | 4/2009 | Varanasi | |

FOREIGN PATENT DOCUMENTS

EP 1681841 7/2006

(Continued)

OTHER PUBLICATIONS

USPTO Office Action Summary from U.S. Appl. No. 12/060,320 mailed Oct. 25, 2010.

(Continued)

*Primary Examiner* — Nimesh Patel

(57) ABSTRACT

A method and system are described for operating a source communication device. The source communication device receives a first request from a user through a user interface requesting a first communication session with a target communication device. The source communication device transfers a first signal to a network requesting the first communication session with the target communication device, wherein the target communication device provides an overt communication alert for the first communication session. The source communication device receives a second request from the user requesting a second communication session requesting that the target communication device provide a covert communication alert for the second communication session. The source communication device transfers a second signal to the network requesting the second communication session with the target communication device and indicating the request for the covert communication alert, wherein the target communication device provides the covert communication alert for the second communication session.

18 Claims, 14 Drawing Sheets

FOREIGN PATENT DOCUMENTS

| | | |
|---|---|---|
| EP | 1717685 | 11/2006 |
| EP | 1775669 | 4/2007 |
| WO | 2005050857 | 6/2005 |
| WO | 2009050254 | 4/2009 |

OTHER PUBLICATIONS

Sprint; "Phone User Guide—Sprint PCS Vision Phone SCP-7000 by Sanyo," Jan. 2006; pp. 1-254; Sprint Nextel; http://support.sprint.com/global/pdf/user_guides/sanyo/scp7000/scp7000_by_sanyo_ug.pdf.

Amy K. Karlson, et al.; "Can I Borrow Your Phone? Understanding Concerns When Sharing Mobile Phones;" CHI 2009 ~ Studying Cell Phone Use; Apr. 8, 2009; pp. 1647-1650; Microsoft Research; Boston, MA.

* cited by examiner

SECRET MODE MENU

1. VIEW COVERT CALL HISTORY

2. VIEW COVERT TEXT HISTORY

3. VIEW COVERT IM HISTORY

4. VIEW COVERT EMAIL HISTORY

5. TRANSMIT COMMUNICATION (CALL, TEXT, IM, EMAIL)

6. VIEW COVERT CONTACT LIST

7. CHANGE ALERT TYPE

8. CHANGE COVERT ALERTING DEVICE

9. ADD COVERT CONTACT

10. DELETE COVERT CONTACT

11. CONVERT COVERT CONTACT TO OVERT CONTACT

12. CONVERT OVERT CONTACT TO COVERT CONTACT

13. RETRIEVE COVERT VOICEMAIL

FIGURE 9

COVERT AND NON-COVERT MODE COMMUNICATION

RELATED APPLICATIONS

This patent application is a continuation-in-part of U.S. patent application entitled "COVERT MODE COMMUNICATION" filed on Apr. 1, 2008 and assigned application Ser. No. 12/060,320.

TECHNICAL BACKGROUND

Wireless telephone users today are alerted to a call or message on their wireless telephone by a sound or a vibration. Alternatively, a user may turn their wireless telephone alerts off completely so that they must check their wireless telephone to see if they have received any calls or messages.

An issue arises when a wireless telephone user would like to be alerted to some incoming calls, but not to others. There are also times when a calling wireless telephone user would like a receiving wireless telephone user to be alerted to an incoming call or message without being detected by anyone else in the proximity. Further, a user may want to keep a private contact list and communication history on the user's wireless telephone that is not accessible to others.

OVERVIEW

A method and system are described for operating a source communication device. The source communication device receives a first request from a user through a user interface requesting a first communication session with a target communication device. In response to the first request, the source communication device transfers a first signal to a network requesting the first communication session with the target communication device, wherein the target communication device provides an overt communication alert for the first communication session. The source communication device receives a second request from the user through the user interface requesting a second communication session with the target communication device and further indicating a request that the target communication device provide a covert communication alert for the second communication session. In response to the second request, the source communication device transfers a second signal to the network requesting the second communication session with the target communication device and indicating to the target communication device the request for the covert communication alert at the target communication device, wherein the target communication device provides the covert communication alert for the second communication session.

BRIEF DESCRIPTION OF THE DRAWINGS

FIG. 9 is a block diagram that illustrates a user menu.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

A method of receiving a communication in a communication device capable of providing a covert communication alert is first described in order to facilitate an understanding of a source communication device capable of transmitting a communication that indicates a request to provide a covert communication alert at a target communication device. A discussion of the source communication device begins with the description of FIG. 10.

Receiving a Communication

Figure 1:
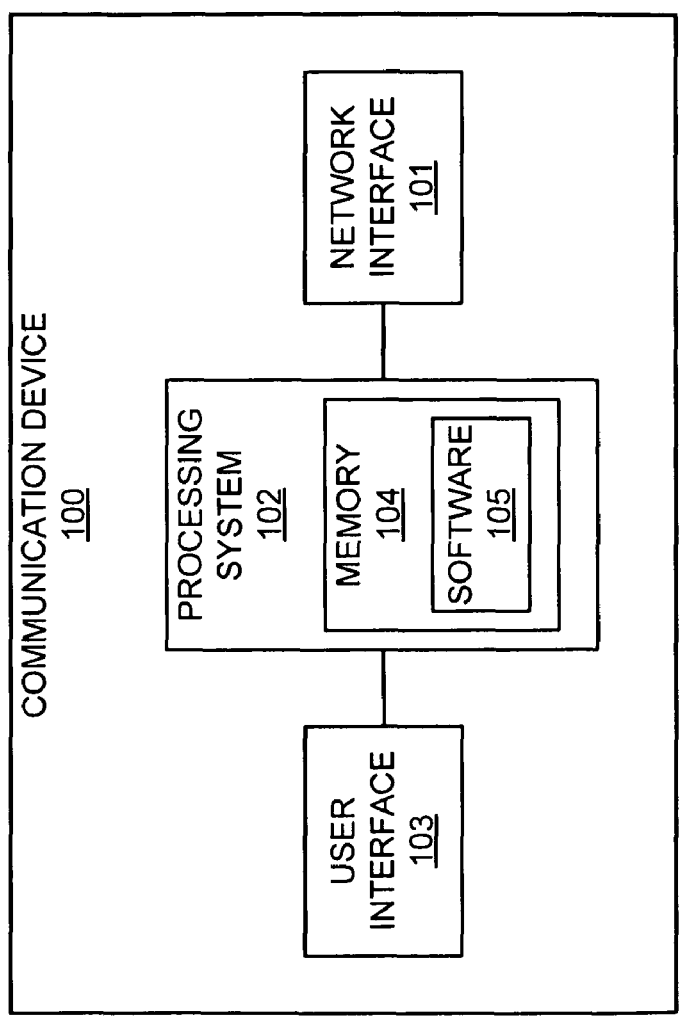
FIG. 1 is a block diagram that illustrates a communication device.

FIG. 1 is a block diagram that illustrates communication device 100. Communication device 100 comprises network interface 101, processing system 102, and user interface 103. Processing system 102 comprises memory 104. Memory 104 stores software 105. Processing system 102 is linked to network interface 101 and user interface 103. Communication device 100 comprises a wireless telephone, an Internet appliance, a pager, a personal digital assistant, a computer, or some other wireless transceiver. Communication device 100 may be distributed among multiple devices that together comprise elements 101-105.

Network interface 101 comprises transceiver circuitry that provides Bluetooth, Wireless Fidelity (Wi-Fi), Worldwide Interoperability for Microwave Access (WiMAX), Radio Frequency (RF), or some other form of wireless communication. Network interface 101 may be distributed among multiple components. Processing system 102 comprises, in addition to memory 104, a computer microprocessor, logic circuit, or some other processing device. Memory 104 comprises a disk, tape, integrated circuit, server, or some other memory device. Memory 104 may be distributed among multiple memory components. Processing system 102 may be distributed among multiple processing components. User interface 103 comprises a keypad, mouse, voice recognition interface, microphone and speakers, graphical display, touch screen, or some other type of user device. User interface 103 may be distributed among multiple user components.

Processing system 102 retrieves and executes software 105 from memory 104. Software 105 comprises an operating system, utilities, drivers, networking software, or other software typically loaded onto a communication device. Software 105 comprises an application program, firmware, or some other form of machine-readable processing instructions. When executed by processing system 102, software 105 directs processing system 102 to operate as described herein.

Figure 2:
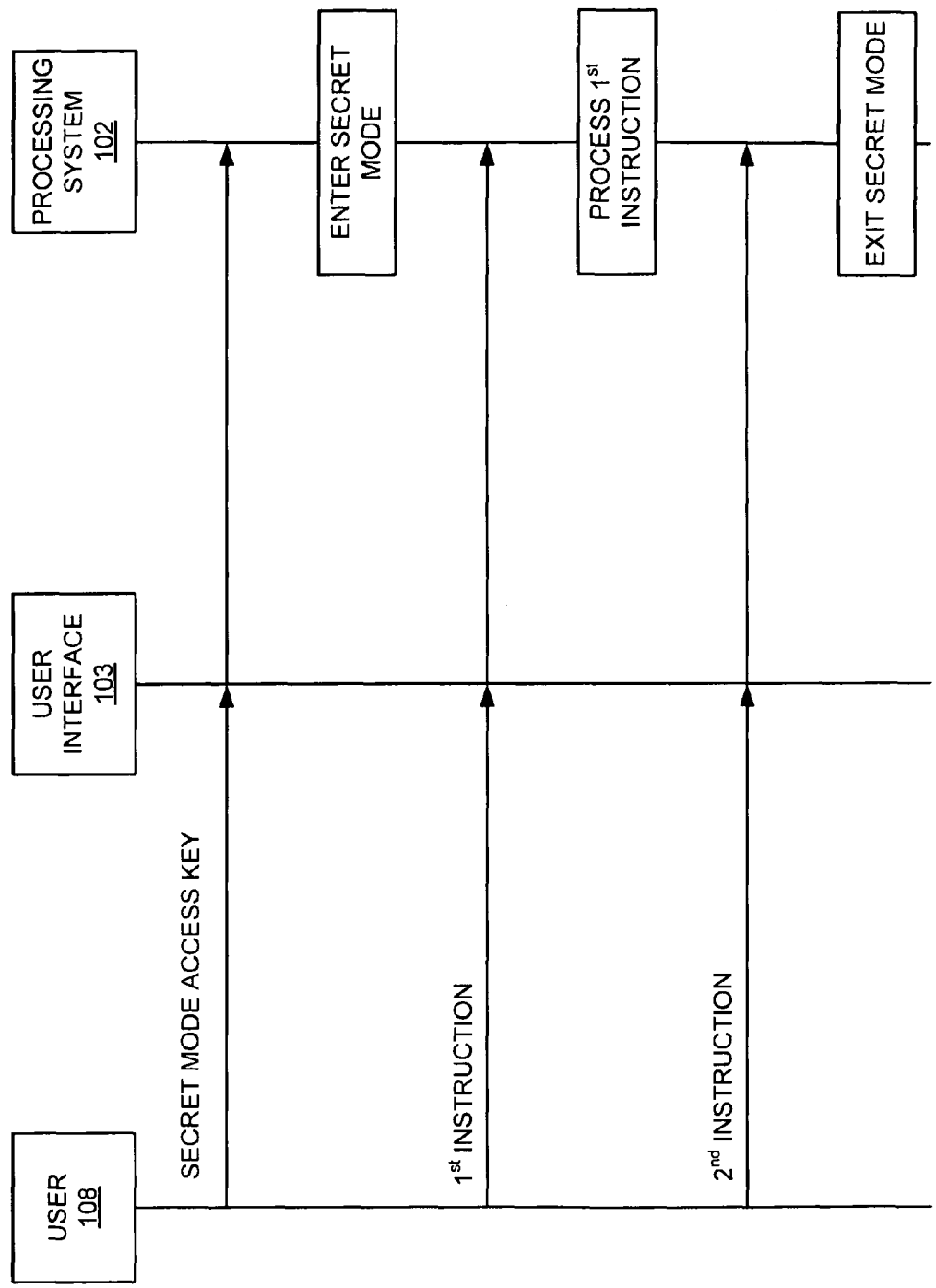
FIG. 2 is a sequence diagram that illustrates a method of operating a communication device.

FIG. 2 is a sequence diagram that illustrates the operation of communication device 100. A user (user 108 in FIG. 2) enters a secret mode access key through user interface 103. The secret mode access key comprises a password, number sequence, biometric data, or some other form of passcode. The secret mode access key is not displayed in user interface 103, but is, instead, blacked out or hidden. User interface 103 transmits the secret mode access key to processing system 102. In response to receiving the secret mode access key, processing system 102 enters a secret mode.

Once communication device 100 is in secret mode, the user enters a first instruction through user interface 103. The first instruction indicates a covert communication source. The covert communication source might be indicated by a telephone number, an email address, an instant messaging (IM) ID, or some other form of communication source identifier. User interface 103 transmits the first instruction to processing system 102. Processing system 102 receives and processes the first instruction to handle the covert communication source.

The user then enters a second instruction through user interface 103. The second instruction comprises an instruction to exit the secret mode. User interface 103 transmits the second instruction to processing system 102. Processing system 102 receives and processes the second instruction and exits the secret mode.

Figure 3:
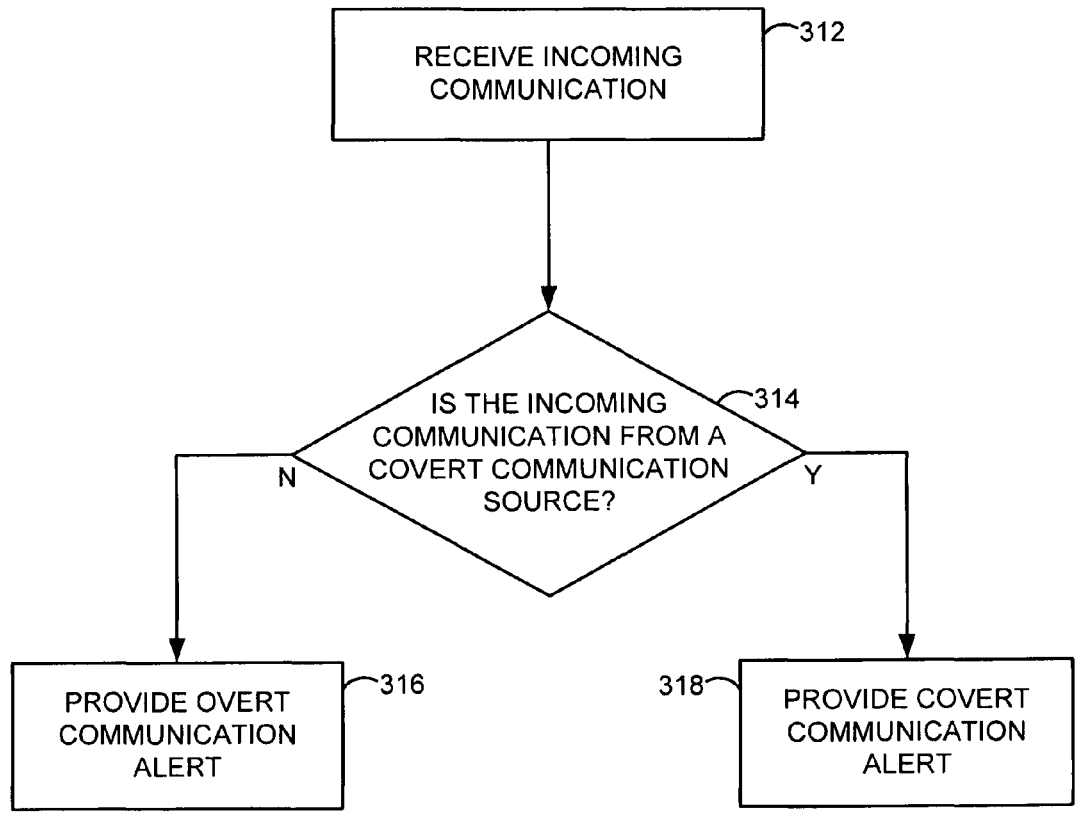
FIG. 3 is a flow diagram that illustrates a method of operating a communication device.

FIG. 3 is a flow diagram that further illustrates the operation of communication device 100. After the user has entered instructions on handling the covert communication source and communication device 100 has exited the secret mode as illustrated in FIG. 2, communication device 100 receives an incoming communication through network interface 101 (operation 312). The incoming communication comprises a telephone call, a text message, a picture message, an instant message, a voicemail, an email, or any other form of wireless communication.

Network interface 101 transmits the incoming communication to processing system 102. Software 105 drives processing system 102 to determine whether the incoming communication is from the covert communication source (operation 314). The covert communication source comprises the covert communication source about which the user entered the first instruction in FIG. 2. If the incoming communication is not from the covert communication source, then it is from an overt communication source. An overt communication source comprises any communication source which a user has not designated as a covert communication source in the secret mode.

If the incoming communication is from the covert communication source, then communication device 100 provides a covert communication alert (operation 318). The covert communication alert comprises no alert (no sound, no movement, and no change in user interface 103) or a silent, visual change in user interface 103 that is not typically associated with an incoming communication. For example, the covert change in user interface 103 could be a change in a location of a display item, a rotation of the display item, a change in color of the display item, or any other subtle visual alteration in user interface 103. The display item comprises a battery icon, a calendar, a time, a date, a signal strength indicator, or any other element of user interface 103. The covert communication alert is not obvious to anyone near communication device 100.

If the incoming communication is not from the covert communication source (i.e. is from an overt communication source), then communication device 100 provides an overt communication alert (operation 316). The overt communication alert comprises an audible or visual indicator that is typically associated with an incoming communication. For example, the overt communication alert could be an audible sound, a ringtone, a vibration, the appearance of an envelope icon, an evident change in user interface 103, or any other explicit alert. The overt change in user interface 103 comprises a flashing display, a textual display, a color-changing display, or any other obvious alteration in user interface 103.

Figure 4A:
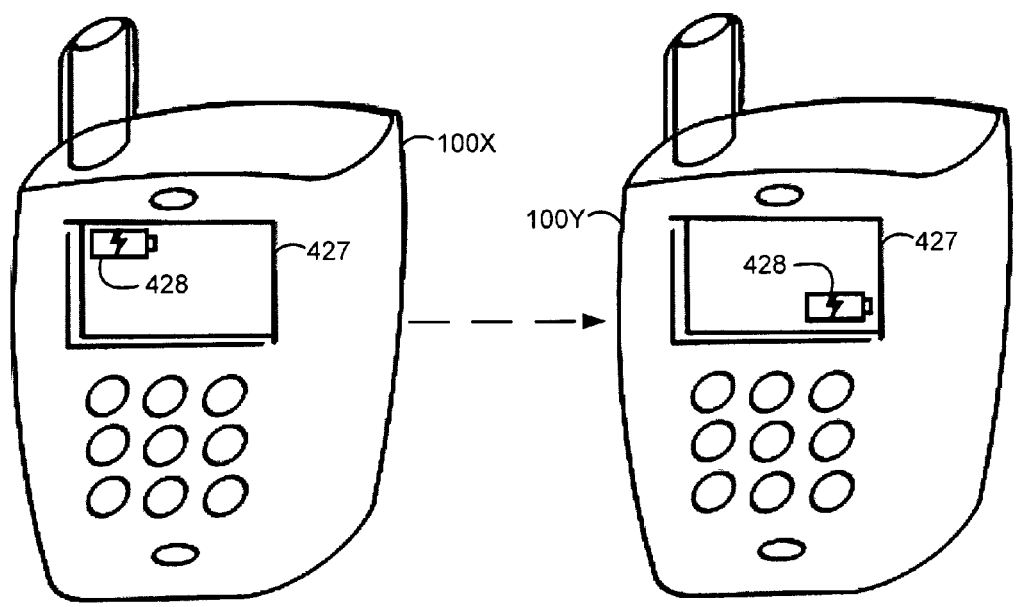
FIG. 4A is a block diagram that illustrates a communication device.
Figure 4B:
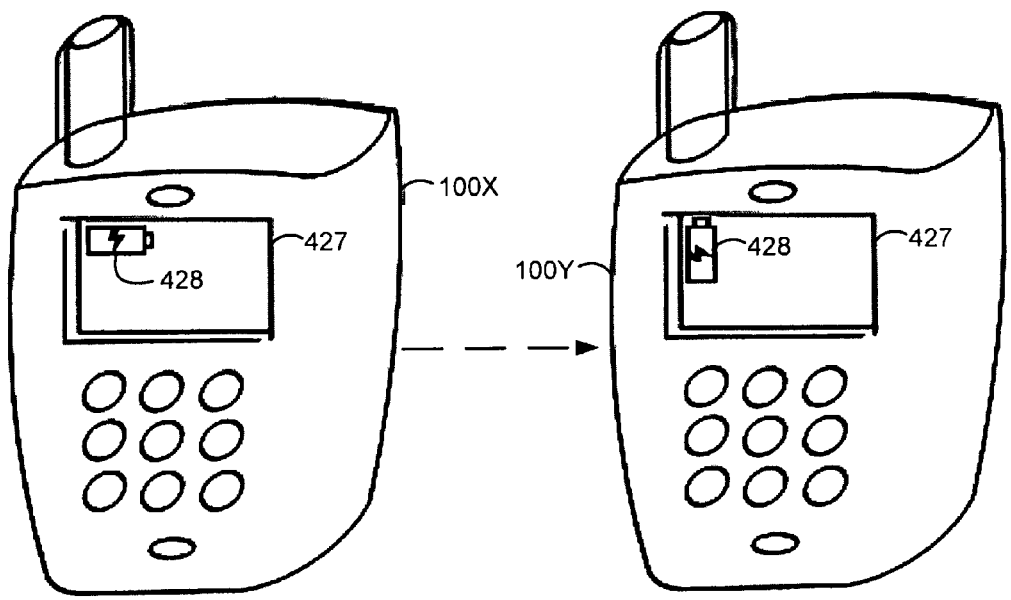
FIG. 4B is a block diagram that illustrates a communication device.

FIGS. 4A and 4B illustrate examples of a covert communication alert in communication device 100, wherein the covert communication alert comprises only changing a location of a displayed item.

In FIG. 4A, communication device 100X represents communication device 100 before receiving an incoming communication. Communication device 100Y represents communication device 100 after receiving an incoming communication from a covert communication source and after providing a covert communication alert. Communication device 100 comprises display 427 and battery power indicator 428. In communication device 100X, battery power indicator 428 is shown in its normal position in the top right-hand corner of display 427. In communication device 100Y, battery power indicator 428 has been moved to a new position in the bottom left-hand corner of display 427 to indicate a covert communication alert in response to an incoming communication from a covert communication source.

In FIG. 4B, communication device 100X represents communication device 100 before receiving an incoming communication. Communication device 100Y represents communication device 100 after receiving an incoming communication from a covert communication source and after providing a covert communication alert. Communication device 100 comprises display 427 and battery power indicator 428. In communication device 100X, battery power indicator 428 is shown in its normal position in the top right-hand corner of display 427. In communication device 100Y, battery power indicator 428 has been rotated ninety degrees counterclockwise to indicate a covert communication alert in response to an incoming communication from a covert communication source.

Additionally, the covert communication alert may be personalized for different covert communication sources. For example, in response to the receipt of an incoming communication from covert communication source A, communication device 100 may change the color of battery power indicator 428. Further, in response to the receipt of an incoming communication from covert communication source B, communication device 100 may rotate battery power indicator 428 ninety degrees. A covert alert option could be associated with a specific covert communication source or with a specific covert communication priority level.

In one example, a covert alert comprises a data message that is transferred to a user-specified location. The covert alert could be a text message transferred to another communication device, an email sent from the communication device to a user-defined email address, an Instant Message, or any other type of data message transferred to a user-defined location.

In one embodiment, a communication device may process all incoming communications covertly as the default setting. Incoming communications would only be processed overtly if they were placed on an overt communication list.

Figure 5:
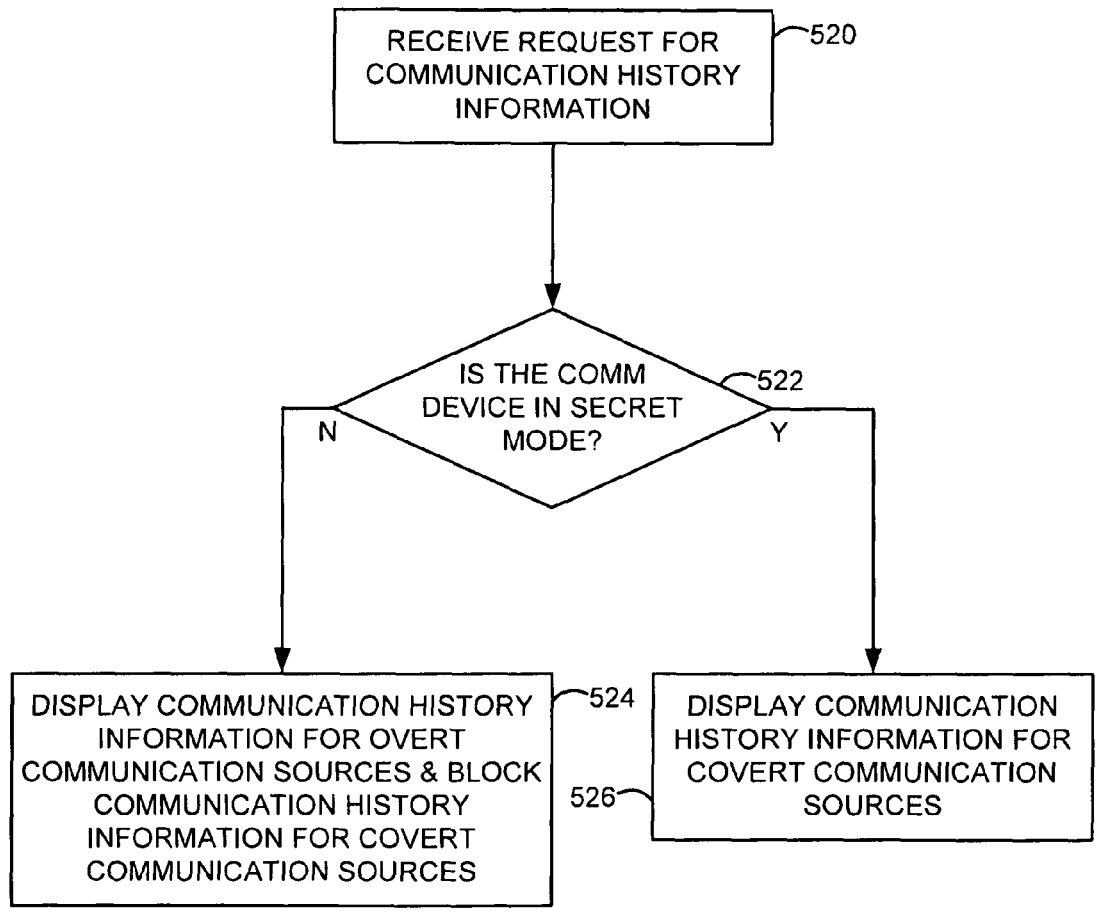
FIG. 5 is a block diagram that illustrates a communication device.

FIG. 5 is a flow diagram that further illustrates the operation of communication device 100. After a user has entered instructions on handling the covert communication source and communication device 100 has exited the secret mode as illustrated in FIG. 2, communication device 100 receives a request for communication history information from the user (operation 520). Communication history information comprises communication sources, communications received, communications sent, pending communications, missed communications, and any other communication history stored on communication device 100.

In response to the request for communication history information, communication device 100 determines whether or not the communication device is in secret mode (operation 522). If communication device 100 is not in secret mode, then communication device 100 displays communication history information related to overt communication sources and blocks communication history information related to covert communication sources (operation 524).

If communication device 100 is in secret mode (i.e. a user entered a secret mode access key and communication device 100 entered secret mode), then communication device 100 displays communication history information related to covert communication sources (operation 526).

Figure 6:
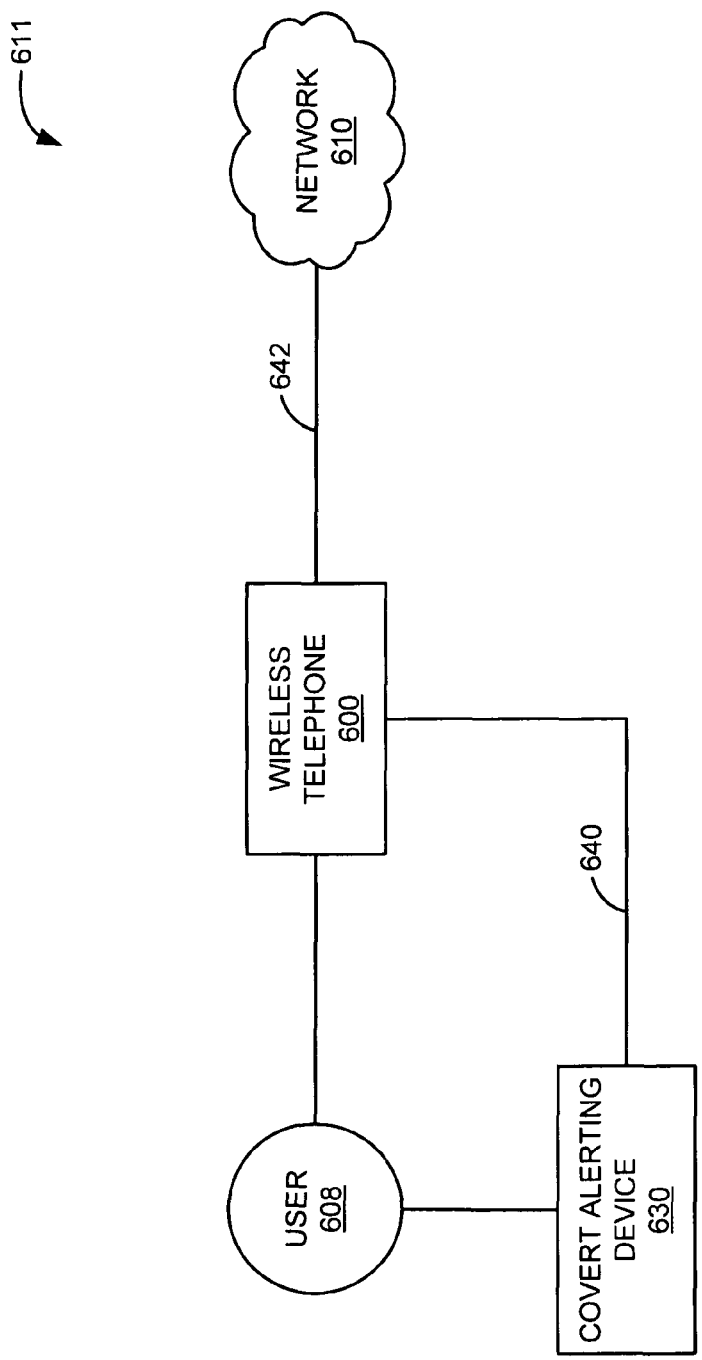
FIG. 6 is a block diagram that illustrates a communication system.

FIG. 6 is a block diagram that illustrates communication system 611. Communication system 611 comprises wireless telephone 600, network 610, user 608, and covert alerting device 630. User 608 is in communication with wireless telephone 600 and covert alerting device 630.

Covert alerting device 630 comprises a watch, a ring, a piece of jewelry, a pen, or any other personal accessory. Covert alerting device 630 is shown in greater detail in FIG. 8.

Network 610 comprises a telephone system, an Internet access system, a data system, a media (audio/video) system, a service platform, or some other system that provides a communication service to wireless telephone 600.

Wireless telephone 600 and network 610 communicate over link 642. Link 642 comprises a wireless communication link using Wi-Fi, WiMAX, Code Division Multiple Access (CDMA), Global System for Mobile communications (GSM), or any other form of wireless communication. Link 642 may be a direct wireless link or may comprise various intermediate systems and components.

Wireless telephone 600 and covert alerting device 630 communicate over link 640. Link 640 comprises Bluetooth, Wi-Fi, WiMAX, RF, or any form of wireless communication that could transmit between wireless telephone 600 and covert alerting device 630.

Figure 7:
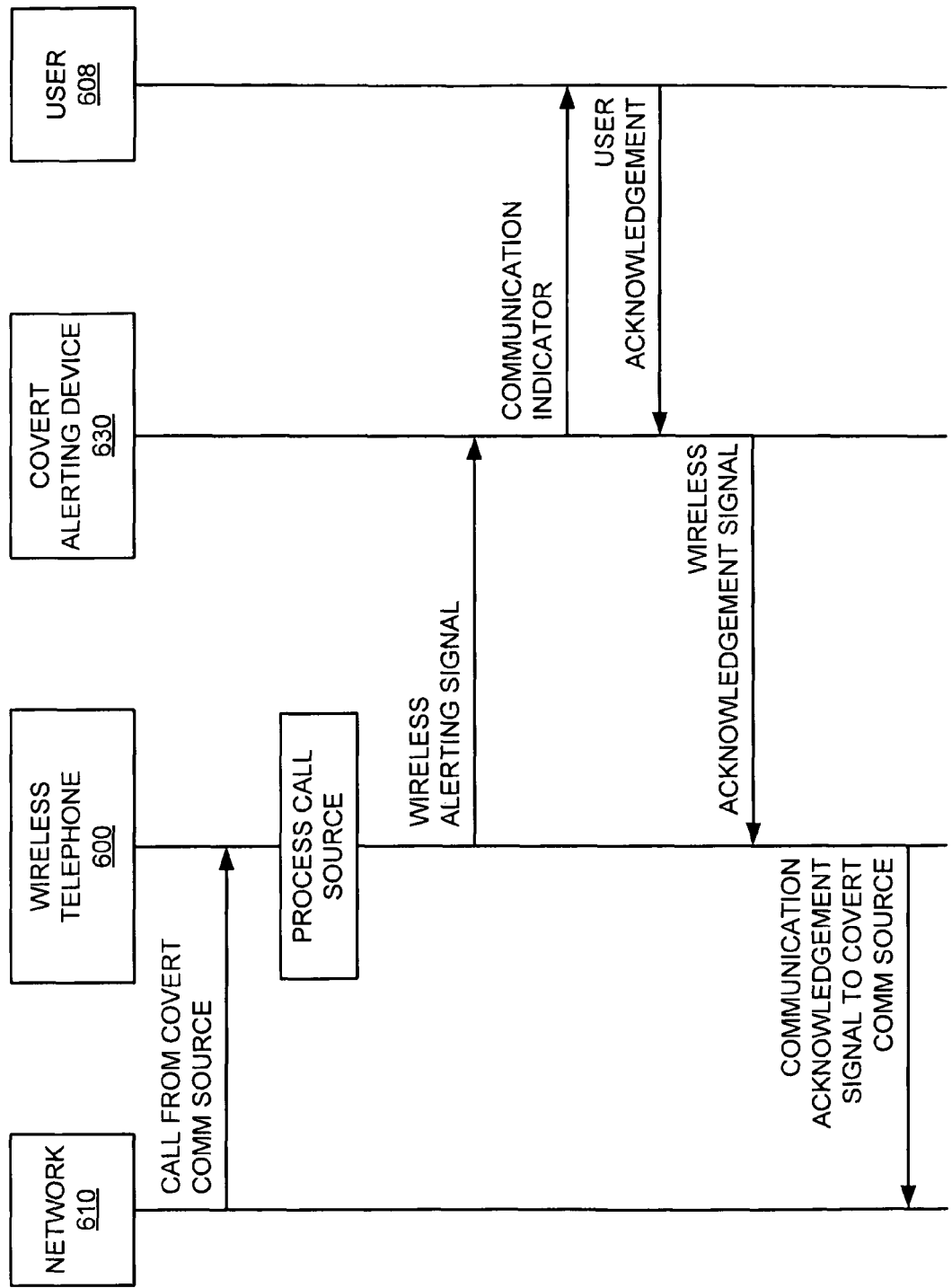
FIG. 7 is a sequence diagram that illustrates a method of operating a communication system.

FIG. 7 is a sequence diagram that illustrates the operation of communication system 611. After user 608 has entered instructions on handling a covert communication source and wireless telephone 600 has exited the secret mode as previously discussed, network 610 transmits a call from the covert communication source to wireless telephone 600 over link 642. Wireless telephone 600 processes the incoming call to determine that it is from the covert communication source. Since the call in this example is from the covert communication source, wireless telephone 600 transmits a wireless alerting signal to covert alerting device 630 over link 640. In response to receiving the wireless alerting signal, covert alerting device 630 provides a communication indicator to user 608.

The communication indicator is a silent indicator that is not typically associated with an incoming communication. For example, the communication indicator could be a physical protrusion, a rotating wheel, a moving bristle, or any physical touch alert that is perceptible only to user 608. The communication indicator could be a covert communication alert as described above.

After user 608 perceives the communication indicator from covert alerting device 630, user 608 produces a user acknowledgement of the communication indicator. In response to receiving the user acknowledgement, covert alerting device 630 transmits a wireless acknowledgement signal to wireless telephone 600 over link 640. Wireless telephone 600 receives the wireless acknowledgement signal, and in response, transmits a communication acknowledgement signal to the covert communication source (not shown) over link 642 and network 610.

Figure 8:
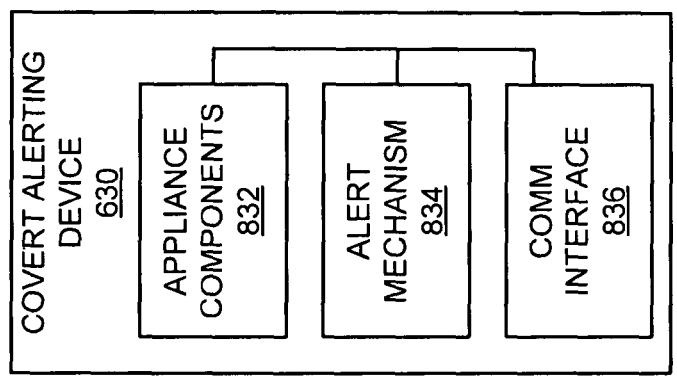
FIG. 8 is a block diagram that illustrates a covert alerting device.

FIG. 8 is a block diagram that illustrates covert alerting device 630. Covert alerting device 630 comprises appliance components 832, alert mechanism 834, and communication interface 836. Appliance components 832, alert mechanism 834, and communication interface 836 are in communication with one another.

Appliance components 832 comprise the structure and functionality of covert alerting device 630. For example, if covert alerting device 630 is a wristwatch, the appliance components 832 comprise the mechanical or electronic elements that enable covert alerting device 630 to function as a normal wristwatch.

Communication interface 836 comprises a wireless transceiver capable of communication via Bluetooth, Wi-Fi, WiMAX, RF, or any form of wireless communication that could transmit between wireless telephone 600 and covert alerting device 630.

Alert mechanism 834 could comprise a magnetic or pneumatic piston that protrudes from covert alerting device 630 and touches user 608. For example, if covert alerting device 630 is a wristwatch, then alert mechanism 834 could be a piston build into the back of the wristwatch that protrudes and pokes user 608 in the event of a call from a covert communication source.

Alert mechanism 834 could also comprise a rotating wheel, a moving bristle, or any other physical touch alert that is perceptible only to user 608. Alert mechanism 834 cannot be perceived by others in the proximity of covert alerting device 630 because it is silent to the human ear, not in visible sight, and not a perceptible movement to anyone aside from user 608.

Alternatively, alert mechanism 834 could also be a covert change in the functionality of covert alerting device 630. For example, if covert alerting device 630 is a watch with a second hand, then alert mechanism 834 may be a change in the motion of the second hand. The change in the motion of the second hand comprises moving the second hand at five-second increments instead of the usual one-second increments, stopping movement of the second hand, pointing the second hand to a predetermined number on the face of the watch, or any other alteration in the functionality of the watch that is perceptible to user 608 and not obvious to others in the immediate area.

Additionally, the covert communication alert may be personalized for different covert communication sources. For example, in response to the receipt of a message from covert communication source A, the second hand of the watch may point to the number 3. Further, in response to the receipt of a message from covert communication source B, the second hand of the watch may point to the number 9. The covert communication alert may also indicate the priority level of a covert communication.

FIG. 9 is a display diagram that illustrates an example of a user menu. Secret mode menu 946 is displayed to user 608 in user interface 103 when wireless telephone 600 is in secret mode. Secret mode menu 946 comprises the following thirteen options: view covert call history, view covert text history, view covert IM history, view covert email history, transmit communication (in the form of call, text, IM, or email), view covert contact list, change alert type, change covert alerting device, add covert contact, delete covert contact, convert covert contact to overt contact, convert overt contact to covert contact, and retrieve covert voicemail. Secret mode menu 946 may comprise other user options not shown in FIG. 9.

When selected by user 608, option 1, view covert call history, displays a list of calls made, calls received, and missed calls along with a contact name and telephone number for each call related to a covert communication source.

When selected by user 608, option 2, view covert text history, displays a list of text messages sent, text messages received, and pending text messages along with a contact name and telephone number for each text message related to a covert communication source.

When selected by user 608, option 3, view covert IM history, displays a list of instant messages sent, instant messages received, and pending instant messages along with a contact name and IM ID for each instant message related to a covert communication source.

When selected by user 608, option 4, view covert email history, displays a list of emails sent, emails received, and pending emails along with a contact name and email address for each email related to a covert communication source.

When selected by user 608, option 5, transmit communication (call, text, IM, email), sends a selected communication to a selected covert communication source.

When selected by user 608, option 6, view covert contact list, displays a list of covert communication sources designated by user 608 while in secret mode.

When selected by user 608, option 7, change alert type, allows user 608 to select the type of covert communication alert that wireless telephone 600 provides upon receiving a communication from a covert communication source. For example, user 608 might select a rotating battery icon alert, a moving signal strength indicator alert, a change in display text color alert, no alert, or any other covert communication alert.

When selected by user 608, option 8, change covert alerting device, allows user 608 to select the type of covert alerting device to use for a covert communication alert. For example, user 608 might select a watch, a ring, a pen, or some over covert alerting device.

When selected by user 608, option 9, add covert contact, allows user 608 to designate, create, and store a contact name for an additional covert communication source. The additional covert communication source will then be displayed when option 6, view covert contact list, is selected by user 608.

When selected by user 608, option 10, delete covert contact, allows user 608 to delete a previously designated covert communication source from the covert contact list.

When selected by user 608, option 11, convert covert contact to overt contact, allows user 608 to select a covert communication source from the covert contact list to transfer to an overt contact list. Once the covert communication source has been transferred to an overt contact, communication from the overt contact will be processed as an overt communication source and will produce overt communication alerts.

When selected by user 608, option 12, convert overt contact to covert contact, allows user 608 to select an overt communication source to transfer to the covert contact list. Once the overt communication source has been transferred to a covert contact, communication from the covert contact will be processed as a covert communication source and will produce covert communication alerts.

When selected by user 608, option 13, retrieve covert voicemail, allows user 608 to listen to voicemail messages from covert communication sources.

In some embodiments, user 608 may enable and disable the covert communication alert function in wireless telephone 600. If the covert communication alert function is disabled, wireless telephone 600 provides overt communication alerts for all incoming communications, whether from overt communication sources or covert communication sources. If the covert communication alert function is enabled, then wireless telephone 600 provides covert communication alerts for incoming communications from covert communication sources and provides overt communication alerts for incoming communications from overt communication sources.

In some embodiments the covert communication alert function in wireless telephone 600 is enabled and disabled based on a Global Positioning System (GPS) location. For example, if user 608 is at a home location, then the covert communication alert function is enabled, but if user 608 is at a work location, then the covert communication alert function is disabled.

In some embodiments, communications received from or transmitted to a covert communication source are not displayed on a user's service bill. The user is still charged for the covert communications, but no information about the covert communication source or the communications themselves are shown on the user's bill. In one example, the covert communication charges could be sent to the user in a separate bill to a different location. Covert billing, emails, and other forms of communication could be managed as defined by the user. These covert elements could be sent to a user-specified address that may be different from a home address, accessed from a wireless communication device with a passcode, accessed via the Internet with a passcode, or emailed to a user-specified email address Likewise, covert call history information could be sent to a user-specified address, accessed from a wireless communication device with a passcode, accessed via the Internet with a passcode, or emailed to a user-specified email address. Further, covert charges may be billed to a user-specified credit card that may be different from the credit card billed for overt charges. Finally, the covert charges may be added as a miscellaneous charge or incorporated into a bulk charge on the user's service bill.

Transferring a Communication

Figure 10:
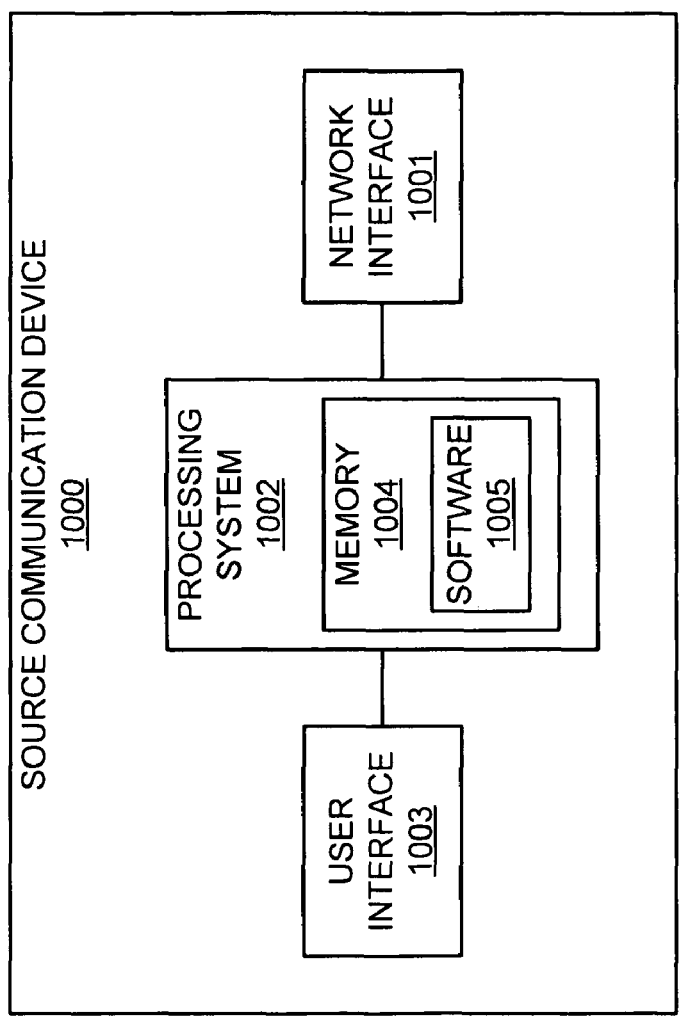
FIG. 10 is a block diagram that illustrates a communication device.

FIG. 10 is a block diagram that illustrates source communication device 1000. Source communication device 1000 provides an example of source communication device 1300, although device 1300 may use other configurations. Source communication device 1000 comprises network interface 1001, processing system 1002, and user interface 1003. Processing system 1002 comprises memory 1004. Memory 1004 stores software 1005. Processing system 1002 is linked to network interface 1001 and user interface 1003. Source communication device 1000 comprises a wireless telephone, an Internet appliance, a pager, a personal digital assistant, a computer, or some other wireless transceiver. Source communication device 1000 may be distributed among multiple devices that together comprise elements 1001-1005.

Network interface 1001 comprises transceiver circuitry that provides Bluetooth, Wireless Fidelity (Wi-Fi), Worldwide Interoperability for Microwave Access (WiMAX), Radio Frequency (RF), or some other form of wireless communication. Network interface 1001 may be distributed among multiple components. Processing system 1002 comprises, in addition to memory 1004, a computer microprocessor, logic circuit, or some other processing device. Memory 1004 comprises a disk, tape, integrated circuit, server, or some other memory device. Memory 1004 may be distributed among multiple memory components. Processing system 1002 may be distributed among multiple processing components. User interface 1003 comprises a keypad, mouse, voice recognition interface, microphone and speakers, graphical display, touch screen, or some other type of user device. User interface 1003 may be distributed among multiple user components.

Processing system 1002 retrieves and executes software 1005 from memory 1004. Software 1005 comprises an operating system, utilities, drivers, networking software, or other software typically loaded onto a communication device. Software 1005 comprises an application program, firmware, or some other form of machine-readable processing instructions. When executed by processing system 1002, software 1005 directs processing system 1002 to operate as described herein.

Figure 11:
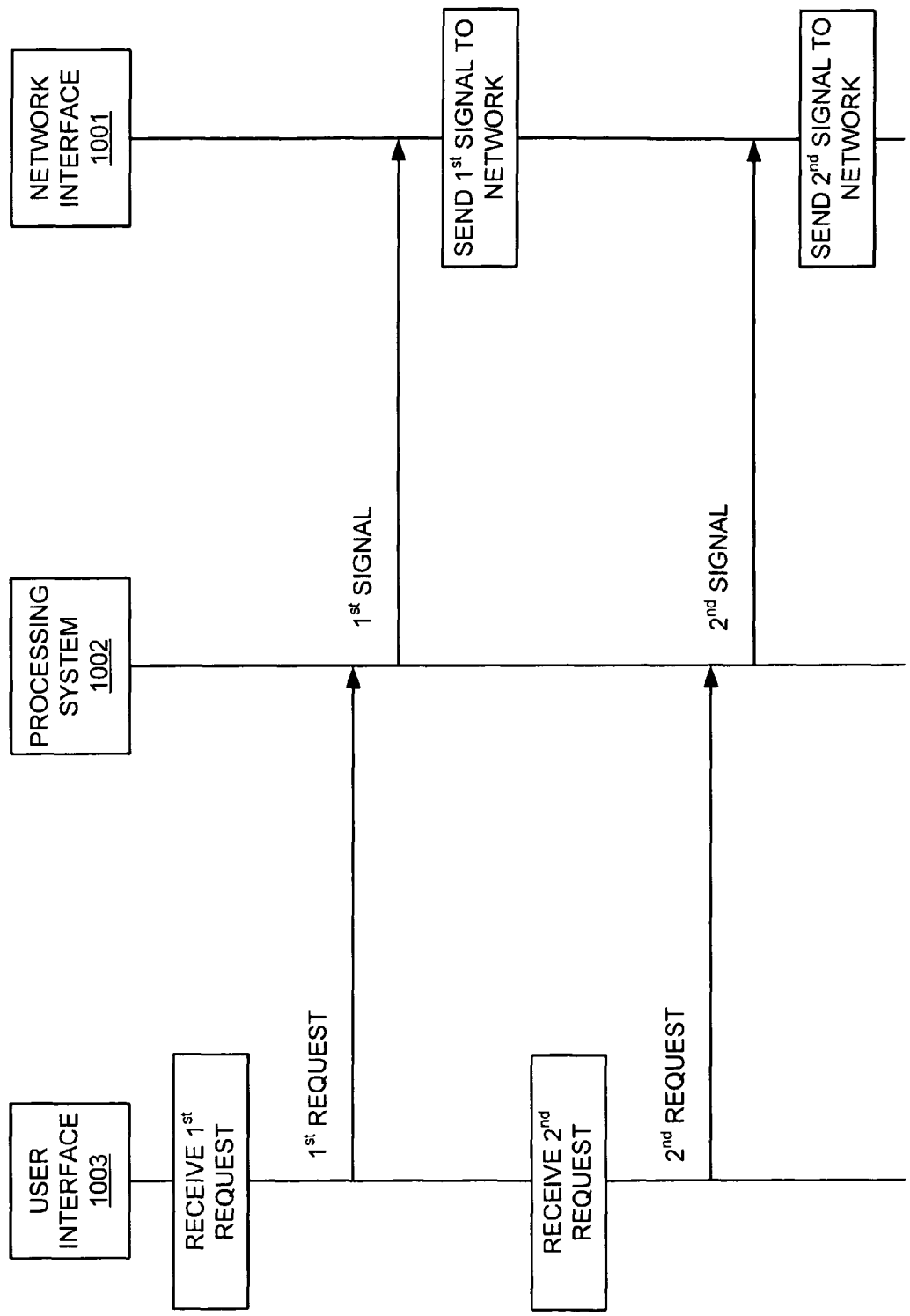
FIG. 11 is a sequence diagram that illustrates a method of operating a communication device.

FIG. 11 is a sequence diagram that illustrates a method of operating source communication device 1000. User interface 1003 receives a first request from a user requesting a first communication session with a target communication device. User interface 1003 transfers the first request to processing system 1002. In response to the first request, processing system 1002 transfers a first signal to a network via network interface 1001 requesting the first communication session with the target communication device, wherein the target communication device provides an overt communication alert for the first communication session.

The overt communication alert comprises an audible or visual indicator that is typically associated with an incoming communication. For example, the overt communication alert could comprise an audible sound, a ringtone, a vibration, the appearance of an envelope icon, an overt change in the user interface of target communication device, or any other explicit alert. The overt change in the user interface of the target communication device could comprise a flashing display, a textual display, a color-changing display, or any other apparent alteration in the user interface of the target communication device.

User interface 1003 receives a second request from the user requesting a second communication session with the target communication device and further indicating a request that the target communication device provide a covert communication alert for the second communication session. User interface 1003 transfers the second request to processing system 1002. In response to the second request, processing system 1002 transfers a second signal to the network via network interface 1001 requesting the second communication session with the target communication device and indicating to the target communication device the request for a covert communication alert at the target communication device, wherein the target communication device provides a covert communication alert for the second communication session.

The target communication device could indicate a covert communication alert for the second communication session through a variety of covert indicators. The covert communication alert comprises no alert (no sound, no movement, and no change in the user interface of the target communication device) or a silent, visual change in the user interface of the target communication device that is not typically associated with an incoming communication. For example, the covert change in the user interface of the target communication device could be a change in a location of a display item, a rotation of the display item, a change in color of the display item, or any other subtle visual alteration in the user interface. For example, the display item could comprise a battery power indicator, a calendar, a time, a date, a signal strength indicator, or any other element displayed on the user interface of the target communication device. The covert communication alert is not obvious to anyone near the target communication device.

In another example, a covert communication alert comprises a data message that is transferred to a user-specified location. The covert communication alert could be a text message transferred to another communication device, an email sent from the target communication device to a user-defined email address, an Instant Message, or any other type of data message transferred to a user-defined location. Additionally, the target communication device could comprise a user-programmable covert alert option so that the target communication device provides different covert communication alerts depending on the source communication device requesting the second communication session, or depending on a covert communication priority level, wherein the covert communication priority level is specified by the source communication device in the indication to the target communication device for the covert communication alert at the target communication device.

Figure 12:
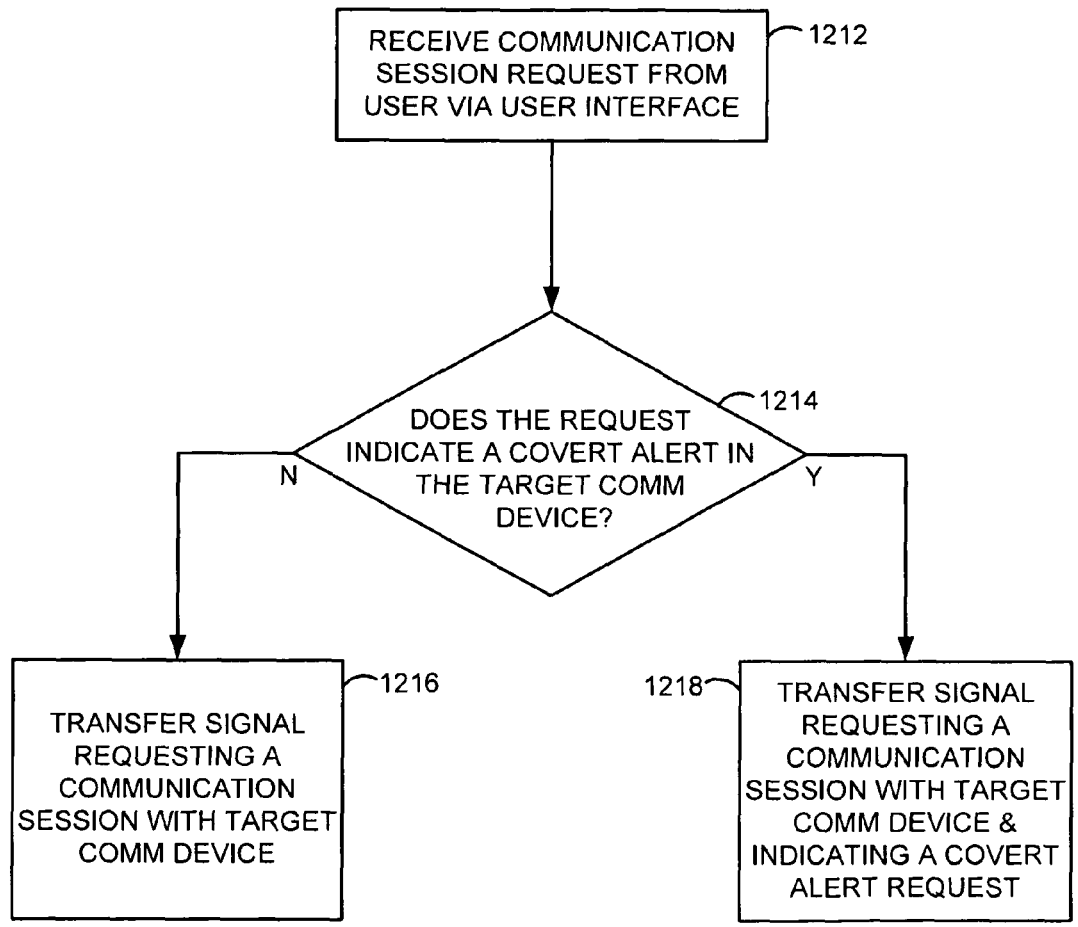
FIG. 12 is a flow diagram that illustrates a method of operating a communication device.

FIG. 12 is a flow diagram that illustrates a method of operating source communication device 1000. Source communication device 1000 receives a request for a communication session with a target communication device from a user via user interface 1003 (operation 1212). Processing system 1002 processes the request from the user to determine whether the request from the user indicates a request for a covert communication alert at the target communication device (operation 1214). If the request from the user does not indicate a request for a covert communication alert at the target communication device, then source communication device 1000 transfers a signal to a network via network interface 1001 requesting a communication session with the target communication device (operation 1216). If the request from the user does indicate a request for a covert communication alert at the target communication device, then source communication device 1000 transfers a signal to a network via network interface 1001 requesting a communication session with the target communication device and indicating a request for a covert communication alert (operation 1218).

Figure 13:
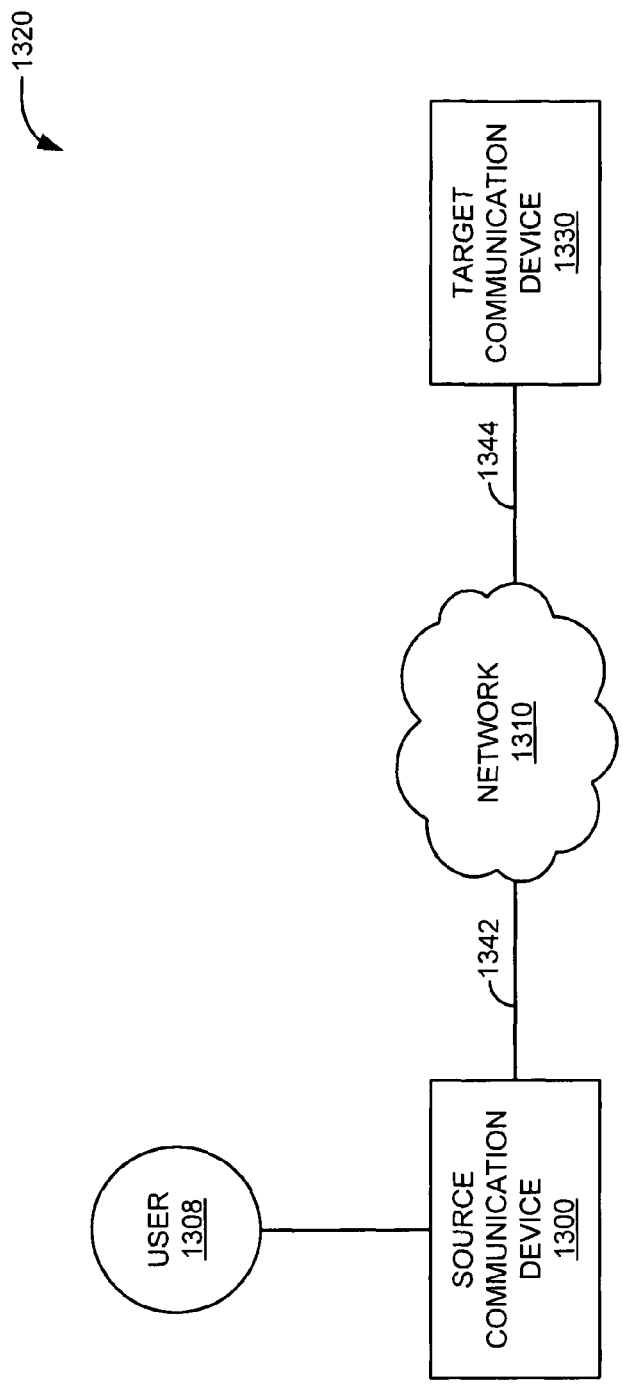
FIG. 13 is block diagram that illustrates a communication system.

FIG. 13 is a block diagram that illustrates communication system 1320. Communication system 1320 comprises source communication device 1300, user 1308, network 1310, and target communication device 1330. Network 1310 is in communication with source communication device 1300 over link 1342. Network 1310 is in communication with target communication device 1330 over link 1344. Source communication device 1300 is in communication with user 1308.

Network 1310 comprises a telephone system, an Internet access system, a data system, a media (audio/video) system, a service platform, or some other system that provides a communication service to source communication device 1300 and target communication device 1330.

Source communication device 1300 and network 1310 communicate over link 1342. Link 1342 comprises a wireless communication link using Wi-Fi, WiMAX, Code Division Multiple Access (CDMA), Global System for Mobile communications (GSM), or any other form of wireless communication. Link 1342 may be a direct wireless link or may comprise various intermediate systems and components.

Target communication device 1330 and network 1310 communicate over link 1344. Link 1344 comprises a wireless communication link using Wi-Fi, WiMAX, CDMA, GSM, or any other form of wireless communication. Link 1344 may be a direct wireless link or may comprise various intermediate systems and components.

User 1308 communicates with source communication device 1300 through a user interface, such as user interface 1003 described previously in FIG. 10.

Figure 14:
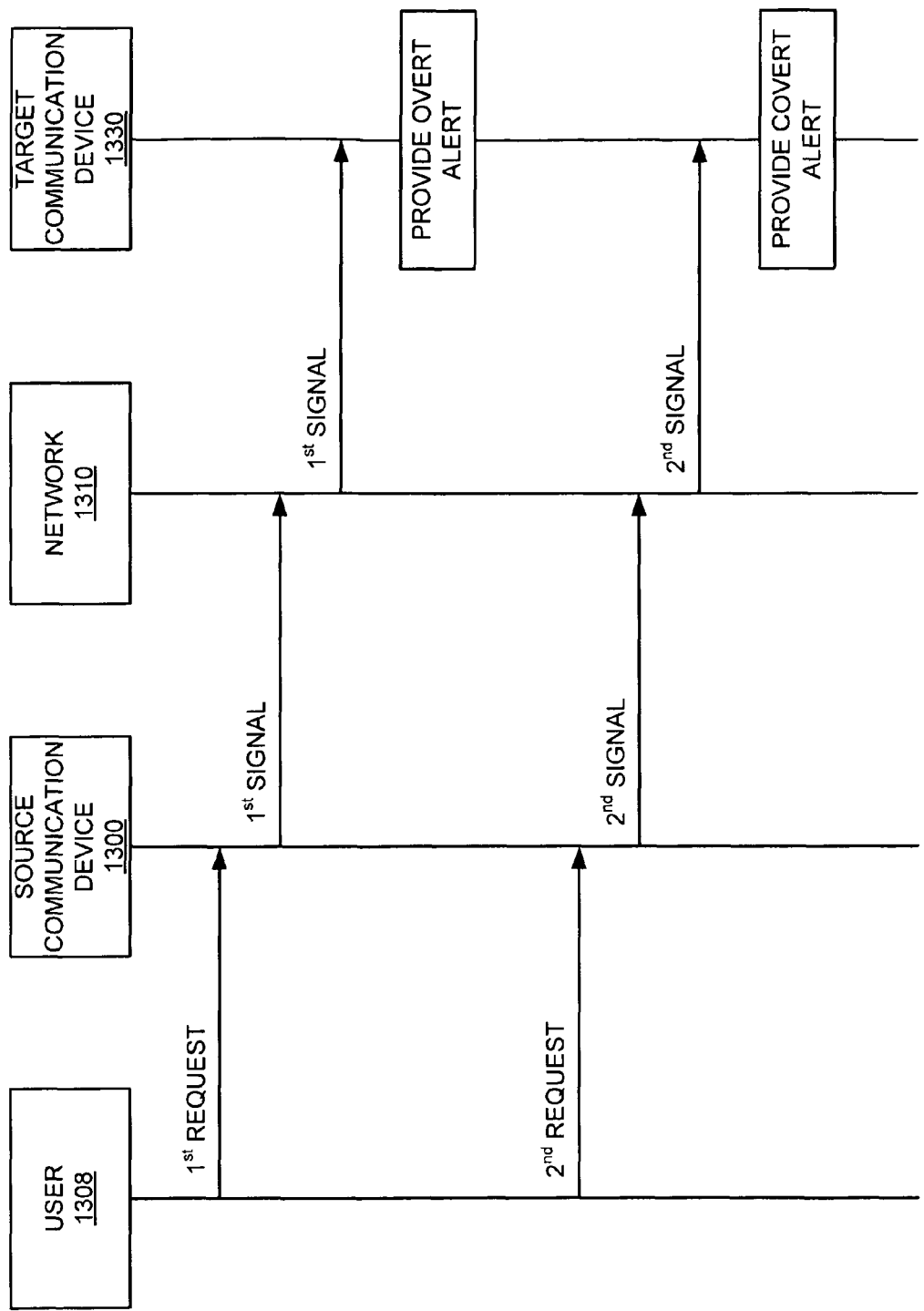
FIG. 14 is a sequence diagram that illustration a method of operating a communication system.

FIG. 14 is a sequence diagram that illustrates a method of operating communication system 1320. User 1308 transfers a first request to source communication device 1300 requesting a first communication session with target communication device 1330. The first request comprises a 10-digit mobile telephone number, a 7-digit mobile telephone number, a menu selection, a spoken command, or some other designation of target communication device 1330 from user 1308 through a user interface.

Source communication device 1300 receives and processes the first request from user 1308. Source communication device 1300 then transfers a first signal to network 1310 over link 1342 requesting the first communication session with target communication device 1330. In response to receiving the first signal from source communication device 1300, network 1310 transfers the first signal to target communication device 1330 over link 1344.

Target communication device 1330 receives the first signal from network 1310 requesting the first communication session. In response to receiving the first signal, target communication device 1330 provides an overt communication alert for the first communication. The overt communication alert was previously described in detail in the description of FIG. 11.

User 1308 transfers a second request to source communication device 1300 requesting a second communication session with target communication device 1330 and indicating a request that target communication device 1330 provide a covert communication alert for the second communication session. The second request comprises a 10-digit mobile telephone number, a 7-digit mobile telephone number, a menu selection, a spoken command, or some other designation of target communication device 1330 from user 1308 through a user interface.

In one embodiment, the indication of the request that target communication device 1330 provide a covert communication alert comprises receiving in source communication device 1300 an input from user 1308 indicating a request that target communication device 1330 provide a covert communication alert for the second communication session. The input comprises a code entered by user 1308 before user 1308 designates target communication device 1330. The code could comprise a digit or digits prepended to a 10-digit number associated with target communication device 1330, a spoken command, or some other method for indicating the request that target communication device 1330 provide a covert communication alert for the second communication session.

In one embodiment, the indication of the request that target communication device 1330 provide a covert communication alert comprises, in source communication device 1300, providing an option to user 1308 to indicate a request that target communication device 1330 provide a covert communication alert for the second communication session. The option comprises a message displayed on a user interface, a menu, an audible indictor, or some other method of providing the option to user 1308 to indicate the request that target communication device 1330 provide a covert communication alert for the second communication session.

Under this embodiment, in response to providing the option to user 1308, source communication device 1300 receives a selection of the option from user 1308 through the user interface to indicate a request that target communication device 1330 provide a covert communication alert for the second communication session. If user 1308 does not select the option, then the second signal does not indicate a request that target communication device 1330 provide a covert communication alert for the second communication session.

In another embodiment, the indication of the request that target communication device 1330 provide a covert communication alert comprises, in source communication device 1300, entering a secret mode in response to receiving a secret mode access key from user 1308 through a user interface. While source communication device 1300 is in the secret mode, user 1308 may designate one or more target communication devices as a covert target. The target communication devices may be selected from a contact list, selected from communication history information, entered as a 10-digit number by user 1308, or selected by some other method.

Under this embodiment, in response to user 1308 designating target communication device 1330 as a covert target, source communication device 1300 indicates the request that target communication device 1330 provide the covert communication alert in all communication session requests to the covert target. User 1308 may override or change a covert target while in the secret mode or by using the option described in the preceding embodiment.

Referring now to FIG. 14, in response to receiving the second request from user 1308, source communication device 1300 transfers a second signal to network 1310 over link 1342 indicating to target communication device 1330 the request for a covert communication alert at the target communication device for the second communication session. Indicating to target communication device 1330 the request for a covert communication alert comprises including a code in a signaling protocol transferred to network 1310 that indicates to target communication device 1330 the request for the covert communication alert at the target communication device. For example, source communication device 1300 inserts one or more digits or characters into a Session Initiation Protocol (SIP) header indicating the request for a covert communication alert.

In response to receiving the second signal from source communication device 1300, network 1310 transfers the second signal to target communication device 1330 over link 1344.

Target communication device 1330 receives the second signal from network 1310 requesting the second communication session and indicating the request for a covert communication alert at target communication device 1330. Target communication device 1330 processes the second signal to determine that source communication device 1300 indicated a request that target communication device 1330 provide a covert communication alert for the second communication session.

In one embodiment, processing the second signal to determine that source communication device 1300 indicated a request for a covert communication alert comprises receiving and processing the signaling protocol to determine that source communication device 1300 requested that target communication device 1330 provide a covert communication alert for the second communication session. For example, target communication device 1330 processes and decodes the one or more digits or characters in the SIP header indicating the request for a covert communication alert.

In response to determining that source communication device 1300 indicated a request that target communication device 1330 provide a covert communication alert for the second communication session, target communication device 1330 provides a covert communication alert for the second communication session. The covert communication alert was previously described in detail in the description of FIG. 11.

In one embodiment, target communication device 1330 may comprise a predetermined communication alert mode that overrides the request from source communication device 1300 for a covert communication alert. In response to receiving the second signal from network 1310, target communication device 1330 determines whether source communication device 1300 is associated with a predetermined alert mode in target communication device 1330. For example, target communication device 1330 could comprise a predetermined alert mode that requires all communication sessions with source communication device 1300 to have an overt communication alert. Target communication device 1330 could also comprise a predetermined alert mode that requires all communication sessions with source communication device 1300 to have a covert communication alert. Alternatively, target communication device 1330 could comprise a predetermined alert mode that allows source communication device 1300 to dictate the type of communication alert for a particular communication session.

In addition, source communication device 1300 may be associated with a predetermined alert mode in target communication device 1330. If source communication device 1300 is associated with a predetermined alert mode in target communication device 1330, then target communication device 1330 provides a communication alert for the second communication session that corresponds to the predetermined alert mode associated with source communication device 1300.

Further, target communication device 1330 could comprise a predetermined alert mode that allows target communication device 1330 to dictate the type of communication alert for a particular type of communication session. For example, the predetermined alert mode of target device 1330 could be programmed to always provide an overt communication alert upon receiving a Short Message Service (SMS) text message, and to always provide a covert communication alert upon receiving an incoming voice call.

In another embodiment, target communication device 1330 could designate a predetermined alert mode by time or date. For example, target communication device 1330 could have a predetermined alert mode that requires all communication sessions initiated after a certain time, such as 10:00 pm, to have a covert communication alert. A second time could also be specified after which all communication sessions initiated could have an overt communication alert, such as 6:00 am. In another example, target communication device 1330 could have a predetermined alert mode that requires all communication sessions initiated on a certain day or days, such as Saturday and Sunday, to have an overt or covert communication alert.

In another embodiment, target communication device 1330 could designate a predetermined alert mode based on the location of target communication device 1330. The location of target communication device 1130 could be obtained using a variety of methods, for example by using Global Positioning System (GPS) data. In an exemplary application of this embodiment, target communication device 1330 could have a predetermined alert mode that requires all communication sessions initiated while the user is at work to have a covert communication alert.

In another embodiment, after source communication device 1300 transfers the second signal to network 1310, source communication device 1300 receives a request for communication history information from user 1308. In response to the request for communication history information, source communication device 1300 determines whether or not source communication device 1300 is in secret mode. If source communication device 1300 is not in secret mode, then source communication device 1300 displays communication history information related to the first signal and blocks communication history information related to the second signal. If source communication device 1300 is in secret mode (i.e. user 1308 entered a secret mode access key and source communication device 1300 entered the secret mode), then source communication device 1300 displays communication history information related to the second signal.

In another embodiment, if source communication device 1300 is transmitting a SMS text message to target communication device 1330, then user 1308 could indicate a request for a covert communication alert by inserting a code into the beginning of the text message. For example, user 1308 could begin the text message by inputting "#478" to indicate to target communication device 1330 the request for a covert communication alert.

In another embodiment, if source communication device 1300 is transmitting a SMS text message to target communication device 1330, then the message could be encrypted with a shared key that allows target communication device 1330 to unencrypt the message upon receipt. For example, when target communication device 1330 receives an encrypted text message from source communication device 1300, a user may input "#379" into target communication device 1330, prompting target communication device 1330 to decrypt and display the text message.

In another embodiment, target communication device 1330 could be provisioned on two different 10-digit mobile numbers, wherein the first 10-digit mobile number is a public number and the second 10-digit mobile number is a private number. When source communication device 1300 requests a communication session with target communication device 1330 using the public number, target communication device 1330 provides an overt communication alert. When source communication device 1300 requests a communication session with target communication device 1330 using the private number, target communication device 1330 provides a covert communication alert.

In some embodiments, a signal indicating a request that the target communication device provide a covert communication alert is not displayed on a user's service bill. The user is still charged for the signal, but no information about the signal or the target communication device are shown on the user's bill. In one example, the signal charges could be sent to the user in a separate bill to a different location. Covert billing, emails, and other forms of communication could be managed as defined by the user. These covert elements could be sent to a user-specified address that may be different from a home address, accessed from a wireless communication device with a passcode, accessed via the Internet with a passcode, or emailed to a user-specified email address. Likewise, communication history information for signals indicating a request that the target communication device provide a covert communication alert could be sent to a user-specified address, accessed from a wireless communication device with a passcode, accessed via the Internet with a passcode, or emailed to a user-specified email address. Further, charges for signals indicating a request that the target communication device provide a covert communication alert may be billed to a user-specified credit card that may be different from the credit card billed for other charges. Finally, the charges for signals indicating a request that the target communication device provide a covert communication alert may be added as a miscellaneous charge or incorporated into a bulk charge on the user's service bill.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a source communication device, the method comprising:
    receiving a first request from a user through a user interface requesting a first communication session with a target communication device;
    in response to the first request, transferring a first signal to a network requesting the first communication session with the target communication device, wherein the target communication device provides an overt communication alert for the first communication session;
    receiving a second request from the user through the user interface requesting a second communication session with the target communication device and further indicating a request that the target communication device provide a covert communication alert for the second communication session, wherein the covert communication alert comprises a visual change to a display item appearing on a user interface of the target communication device where the visual change is associated with a function other than an incoming communication; and
    in response to the second request, transferring a second signal to the network requesting the second communication session with the target communication device and indicating to the target communication device the request for the covert communication alert at the target communication device, wherein the target communication device provides the covert communication alert for the second communication session.

2. The method of claim 1, further comprising in the target communication device:
    receiving the first signal from the network requesting the first communication session and providing the overt communication alert for the first communication session;
    receiving the second signal from the network requesting the second communication session and indicating the request for the covert communication alert at the target communication device;
    processing the second signal to determine that the source communication device indicated the request that the target communication device provide the covert communication alert for the second communication session; and
    in response to determining that the source communication device indicated the request that the target communication device provide the covert communication alert for the second communication session, providing the covert communication alert for the second communication session.

3. The method of claim 1 further comprising, after the second signal is transferred to the network, blocking communication history information for the second signal and providing communication history information for the first signal.

4. The method of claim 3 further comprising entering a secret mode in response to receiving a secret mode access key from the user through the user interface, and in the secret mode, providing the communication history information for the second signal.

5. The method of claim 1 wherein receiving the second request from the user for the second communication session and further indicating the request that the target communication device provide the covert communication alert comprises receiving a user input through the user interface indicating the request that the target communication device provide the covert communication alert for the second communication session, wherein the user input comprises a code prepended to a 10-digit number associated with the target communication device.

6. The method of claim 2 wherein transferring the second signal to the network comprises, in the source communication device, including a code in a signaling protocol that indicates to the target communication device the request for the covert communication alert at the target communication device; and
    in the target communication device, receiving and processing the signaling protocol to determine that the source communication device requested that the target communication device provide the covert communication alert for the second communication session.

7. The method of claim 1 wherein receiving the second request from the user requesting the second communication session and further indicating the request that the target communication device provide the covert communication alert comprises:
    providing an option to the user to indicate the request that the target communication device provide the covert communication alert for the second communication session; and
    receiving a selection of the option from the user through the user interface to indicate the request that the target communication device provide the covert communication alert for the second communication session.

8. The method of claim 1 further comprising:
    entering a secret mode in response to receiving a secret mode access key from the user through the user interface, and in the secret mode, designating the target communication device as a covert target; and
    in response to designating the target communication device as the covert target, setting a covert target option indicating that all subsequent communication session requests to the covert target shall include a subsequent request that the covert target provide a subsequent covert communication alert for each subsequent communication session request.

9. The method of claim 2 wherein processing the second signal to determine that the source communication device indicated the request that the target communication device provide the covert communication alert for the second communication session comprises, in the target communication device:
    determining whether the source communication device is associated with a predetermined alert mode in the target communication device; and
    if the source communication device is associated with the predetermined alert mode, then providing a predetermined communication alert for the second communication session that corresponds to the predetermined alert mode associated with the source communication device.

10. A source communication device comprising:
a network interface;
a user interface configured to receive a first request from a user requesting a first communication session with a target communication device;
in response to the first request, a processing system configured to transfer a first signal to a network, via the network interface, requesting the first communication session with the target communication device, wherein the target communication device provides an overt communication alert for the first communication session;
the user interface configured to receive a second request from the user requesting a second communication session with the target communication device and further indicating a request that the target communication device provide a covert communication alert for the second communication session, wherein the covert communication alert comprises a visual change to a display item appearing on a user interface of the target communication device where the visual change is associated with a function other than an incoming communication; and
in response to the second request, the processing system configured to transfer a second signal to the network, via the network interface, requesting the second communication session with the target communication device and indicating to the target communication device the request for the covert communication alert at the target communication device, wherein the target communication device provides the covert communication alert for the second communication session.

11. The source communication device of claim 10 wherein the target communication device is configured to:
receive the first signal from the network requesting the first communication session and provide the overt communication alert for the first communication session;
receive the second signal from the network requesting the second communication session and indicating the request for the covert communication alert at the target communication device;
process the second signal to determine that the source communication device indicated the request that the target communication device provide the covert communication alert for the second communication session; and
in response to determining that the source communication device indicated the request that the target communication device provide the covert communication alert for the second communication session, provide the covert communication alert for the second communication session.

12. The source communication device of claim 10 further comprising, after the processing system transfers the second signal to the network, the processing system configured to block communication history information for the second signal and to provide communication history information for the first signal, wherein the user interface is configured to display the communication history information for the first signal.

13. The source communication device of claim 12 further comprising the processing system configured to enter a secret mode in response to receiving a secret mode access key from the user through the user interface, and in the secret mode, provide the communication history information for the second signal, wherein the user interface is configured to display the communication history information for the second signal.

14. The source communication device of claim 10 wherein the user interface, to receive the second request from the user requesting the second communication session and further indicating the request that the target communication device provide the covert communication alert for the second communication session, receives a user input indicating the request that the target communication device provide the covert communication alert for the second communication session, wherein the user input comprises a code prepended to a 10-digit number associated with the target communication device.

15. The source communication device of claim 11 wherein the processing system, to transfer the second signal to the network, includes a code in a signaling protocol that indicates to the target communication device the request for the covert communication alert at the target communication device; and
the target communication device configured to receive and process the code in the signaling protocol to determine that the source communication device requested that the target communication device provide the covert communication alert for the second communication session.

16. The source communication device of claim 10 wherein the user interface, to receive the second request from the user requesting the second communication session and further indicating the request that the target communication device provide the covert communication alert, provides an option to the user to indicate the request that the target communication device provide the covert communication alert for the second communication session, and receives a selection of the option from the user to indicate the request that the target communication device provide the covert communication alert for the second communication session.

17. The source communication device of claim 10 further comprising:
the processing system configured to enter a secret mode in response to receiving a secret mode access key from the user through the user interface, and in the secret mode, designate the target communication device as a covert target; and
in response to designating the target communication device as the covert target, the processing system configured to set a covert target option indicating that all subsequent communication session requests to the covert target shall include a subsequent request that the covert target provide a subsequent covert communication alert for each subsequent communication session request.

18. The source communication device of claim 11 wherein the target communication device, to process the second signal to determine that the source communication device indicated the request that the target communication device provide the covert communication alert for the second communication session, determines whether the source communication device is associated with a predetermined alert mode in the target communication device, and if the source communication device is associated with a predetermined alert mode, then the target communication device is configured to provide a predetermined communication alert for the second communication session that corresponds to the predetermined alert mode associated with the source communication device.

* * * * *